June 13, 1944.    O. W. LIVINGSTON    2,351,439
ELECTRIC VALVE OSCILLATOR
Filed May 2, 1941
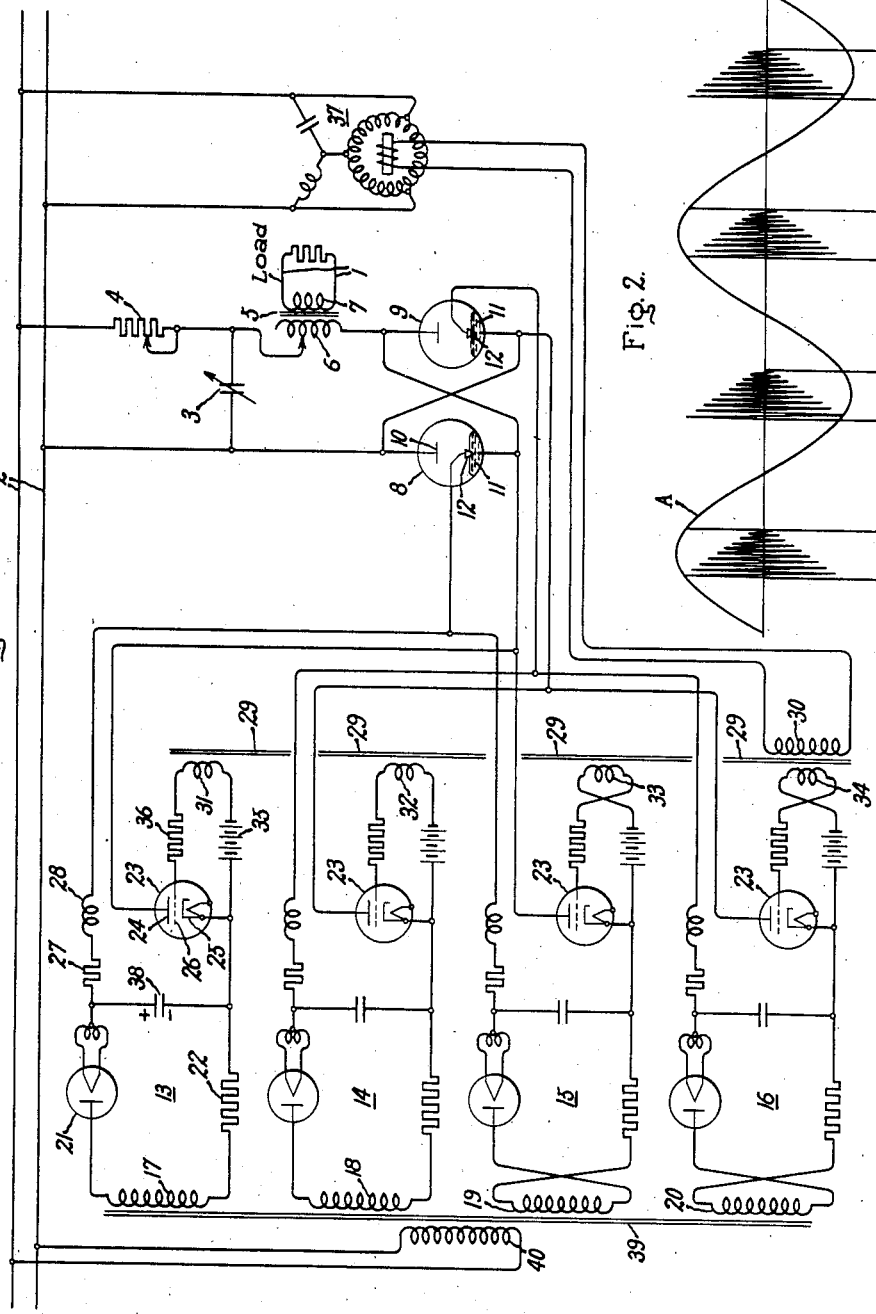
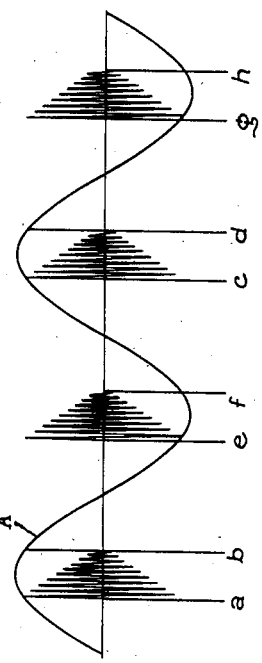
Inventor:
Orrin W. Livingston,
by Harry E. Dunham
His Attorney.

Patented June 13, 1944

2,351,439

UNITED STATES PATENT OFFICE 2,351,439

ELECTRIC VALVE OSCILLATOR

Orrin W. Livingston, Scotia, N. Y., assignor to General Electric Company, a corporation of New York Application May 2, 1941, Serial No. 391,517

8 Claims. (Cl. 250—27)

My invention relates to electric valve translating apparatus and more particularly to electric valve oscillator circuits in which a high frequency load circuit is energized from an alternating current source of commercial frequency.

In some industrial processes, such as in industrial heating operations, it is desirable to supply alternating current of relatively high frequency to a load circuit from a usual source of alternating current of commercial frequency. In accordance with the teachings of my invention described hereinafter, I provide a new and improved system for effecting energization of a load circuit at high frequency by apparatus which is of simple construction and arrangement and which affords a greater degree of flexibility of control than that afforded by the prior art arrangements.

It is an object of my invention to provide a new and improved electric translating system.

It is another object of my invention to provide a new and improved electric valve translating system for energizing a high frequency load circuit from a source of alternating current of commercial frequency.

It is a further object of my invention to provide a new and improved electric valve frequency changing system which transmits relatively high frequency alternating current to a load circuit from a source of alternating current of commercial frequency.

Briefly stated, in the illustrated embodiment of my invention I provide an electric valve frequency changing system which interconnects a source of alternating current of commercial frequency and a high frequency load circuit. The system includes an oscillatory circuit and a pair of reversely connected electric valves for effecting the energization of the load circuit by setting the oscillatory circuit into electrical oscillation. A plurality of excitation means are provided in order to render the electric valve means simultaneously conductive during a predetermined portion or predetermined portions of each cycle of voltage of the supply circuit, and hence effects energization of the load circuit during corresponding intervals of time.

For a better understanding of my invention reference may be had to the following description taken in connection with the accompanying drawing, and its scope will be pointed out in the appended claims.

Fig. 1 diagrammatically illustrates an embodiment of my invention as applied to a system for energizing a load circuit from a suitable source of alternating current such as a commercial source of current having a frequency of sixty cycles, and Fig. 2 represents certain operating characteristics of the arrangement shown in Fig. 1.

Referring more particularly to Fig. 1 of the accompanying drawing, I have diagrammatically illustrated my invention as applied to a system for transmitting relatively high frequency alternating current to a load circuit 1 from a commercial source of alternating current 2, such as an alternating current supply circuit, having a frequency of sixty cycles. I provide an oscillatory circuit which may comprise a capacitance 3 connected to be charged from the alternating current circuit 2 through a suitable impedance element such as a resistance 4. The load circuit 1 is energized from the oscillatory circuit and a transformer 5 may be employed for coupling the load circuit to the oscillatory circuit. The transformer 5 may be provided with a primary winding 6 and a secondary winding 7. If desired, the inductance of the transformer 5 may be utilized or employed as the inductive reactance which, cooperating with the capacitance reactance of capacitance 3, constitutes the tuned or oscillatory circuit. The natural frequency of the oscillatory circuit, of course, may be controlled or adjusted in numerous ways, and as an example of one way I have chosen to represent the capacitance 3 as being adjustable. The effective inductance of the transformer 5 may be controlled or adjusted by means of tap changing or adjusting equipment associated with the primary winding 6.

As a means for providing a symmetrical discharge path for the capacitance 3, and as a means for setting the oscillatory circuit into oscillation, I provide a pair of reversely connected electric valve means 8 and 9. That is, the electric valve means 8 and 9 are oppositely poled or connected oppositely relative to each other so that they conduct current in opposite directions with respect to the associated connected circuit. Although not limited thereto, the electric valve means 8 and 9 may be of the type employing an ionizable medium such as a gas or a vapor, and each comprises an anode 10, a cathode, such as a mercury pool cathode 11, and an associated control means such as an immersion ignitor control member 12. The immersion ignitor control members 12 may be constructed of a material such as boron-carbide or silicon-carbide having an electrical resistivity relatively large as compared with that of the associated mercury, and having an extremity thereof extending below the surface of the mercury pool cathode. Electric valves of this type require the transmission of a predetermined critical minimum value of current between the control members 12 and the associated cathodes 11 in order to render the electric valve means conductive.

In accordance with my invention I provide excitation means for rendering the electric valve means 8 and 9 conductive simultaneously during predetermined portions or predetermined intervals of time during each cycle of voltage of the alternating current source. Of course, when the oscillatory circuit is effecting the transmission of high frequency current to the load circuit 1, the electric valve means 8 and 9 conduct the high frequency current alternately, depending upon the direction of current flow from one plate of the capacitance 3 to the other. However, the excitation means maintains the electric valve means 8 and 9 in condition for conduction by maintaining cathode spots on the associated cathodes 11 during the predetermined intervals of time.

More particularly, I provide a plurality of excitation circuits 13, 14, 15, and 16 for transmitting to the control members 12 electrical impulses of predetermined magnitude and predetermined duration to maintain the electric valve means 8 and 9 simultaneously conductive during predetermined intervals of time of each cycle of the voltage of the supply circuit 2. In order to render the electric valve means 8 and 9 conductive during portions of half cycles of voltage of predetermined polarity, such as portions of positive half cycles of the voltage of circuit 2, I provide excitation circuits 13 and 14 which are designed and arranged to transmit currents of predetermined magnitude and of predetermined duration to render electric valve means 8 and 9 simultaneously conductive during these predetermined intervals. If it is desired to render the electric valve means 8 and 9 conductive during the negative half cycles of voltage of circuit 2, I also provide excitation circuits 15 and 16 which are poled to provide electrical impulses during intervals displaced 180 electrical degrees with respect to those produced by excitation circuits 13 and 14.

Excitation circuits 13—16, inclusive, are similar in construction and arrangement, and in order to facilitate the presentation of the subject matter only the excitation circuit 13 will be considered in detail. It will of course be understood that this description also applies to the other circuits. Excitation circuit 13 is arranged to transmit to the control member 12 of electric valve means 8 an energizing impulse of current which is of a value greater than the minimum critical value of current required to render the electric valve means 8 conductive. Excitation circuit 13 comprises a capacitance 38 which is charged from a suitable source of unidirectional current or charged from the alternating current circuit 2 through a transformer 39 comprising a primary winding 40 and which may include a plurality of secondary windings 17, 18, 19, and 20. A suitable rectifying means, such as a unidirectional conducting device 21 is connected in circuit with secondary winding 17 and capacitance 38 in order to charge the capacitance to the polarity indicated. A current controlling resistance 22 may be connected in circuit with capacitance 38 to limit or control the rate of charge of the capacitance 38. The energizing impulse which is transmitted to the control member 12 is produced by the discharge of the capacitance 38. This discharging operation may be effected by employing a suitable control electric discharge device 23 which is preferably of the type employing an ionizable medium, and which comprises an anode 24, a cathode 25, and a control grid 26. The discharge circuit may also include a current limiting resistance 27 and may include an inductance 28 which serves to render the electric discharge device 23 non-conducting after each discharge of the capacitance 38, so that the grid 26 may regain control.

To render the electric discharge devices 23 in excitation circuits 13—16 conductive, and hence to effect initiation of the discharge of capacitances 38, I provide a transformer having a core member 29, a primary winding 30, and a plurality of secondary windings 31, 32, 33, and 34 which are connected to electric discharge devices 23 and excitation circuits 13—16 respectively. A suitable source of negative unidirectional biasing potential, such as a battery 35, may be employed to impress a hold-off voltage on the grid 26, and a current limiting resistance 36 may be connected in series relation with the battery 35 and the secondary winding 31.

It will be noted that, due to the poling of secondary windings 31 and 32, electric discharge devices 23 in excitation circuits 13 and 14 are rendered conductive simultaneously, and hence transmit corresponding electrical impulses to control members 12 of electric valve means 8 and 9. Furthermore, it will be noted that electric discharge devices 23 in excitation circuits 15 and 16 are also rendered conducting simultaneously due to the corresponding poling of secondary windings 33 and 34. However, excitation circuits 15 and 16 are rendered conducting at times displaced 180 electrical degrees relative to the periods of operation of excitation circuits 13 and 14. This displacement in phase is obtained by the relative connections of windings 31, 32, and 33, 34.

If it is desired to adjust the time during the cycles of voltage of the alternating current source during which the energizing impulses are transmitted to control members 12, I provide suitable means for controlling the time of generation and transmission of current impulses to these control members. For example, I may provide a suitable phase-shifting arrangement such as a rotary phase shifter 37 connected between the primary winding 30 and the alternating current circuit 2 for adjusting the phase of the firing voltage impressed upon control grids 26 of electric discharge devices 23. The phase shifter 37 also controls the amount of power transmitted to load circuit 1.

The operation of the embodiment of my invention shown in Fig. 1 of the drawing may be explained by considering the system when it is operating to transmit alternating current of relative high frequency to the load circuit from the alternating current supply circuit 2 of commercial frequency. Unless energizing impulses of control current are transmitted to the control members 12, the electric valve means 8 and 9 are not conductive, and hence no current is transmitted to the load circuit 1. When the energizing impulses of current are transmitted to the control members 12, electric valve means 8 and 9 are rendered conductive and the oscillatory circuit is set into oscillation and high frequency current is delivered to the load circuit 1 during the period of conduction of the electric valve means 8 and 9.

Considering the system when it is intended to operate to transmit high frequency current to the load circuit 1, during a single interval of time during each cycle of voltage of circuit 2, excitation circuits 13 and 14 transmit impulses of current of corresponding magnitude, wave form and duration to the control members 12, maintaining these electric valve means 8 and 9 simultaneously conductive during this interval of time. Of course, the electric valve means 8 and 9 do not conduct the current simultaneously due to the fact that the high frequency current is alternating. When the right-hand plate of capacitance 3 is charged to its approximate maximum positive potential, the current will start to flow through the electric valve means 9 when an energizing impulse of current is transmitted to control members 12. The current continues to flow through electric valve means 9 in the same direction even after the voltage of capacitance 3 reverses due to the energy stored in the inductance of transformer 5. After the current falls to its zero value, at which time the voltage of the left-hand plate is near its maximum positive value, the electric valve 8 begins to conduct current. Actually, the oscillations of high frequency start when the electric valve means 8 and 9 are excited but the damped high frequency oscillation may reach zero before the end of the period of excitation of the control members 12. For example, electric valve means 8 and 9 may be excited for 15 electrical degrees relative to the voltage of circuit 2, and the high frequency oscillations might reach zero after 15 electrical degrees. That is, the high frequency current is transmitted alternately by the electric valve means 8 and 9, but during the predetermined interval of time both electric valve means 8 and 9 are maintained in a conductive condition by proper energization of the control members 12.

If it is desired to effect the generation of high frequency current twice during each cycle of voltage of circuit 2, as, for example, during both the positive and negative half cycles of voltage, excitation circuits 15 and 16 may be used, and these circuits transmit energizing impulses to the control members 12 during intervals displaced substantially 180 electrical degrees relative to those generated by excitation circuits 13 and 14.

The phase-shifting device 37 may be employed to adjust the time during the cycles of voltage 2 at which the high frequency impulses are initiated. Of course, the phase shifting device 37 may be employed to control the amount of power transmitted to the load circuit 1.

Certain features of excitation circuits 13—16 are disclosed and claimed in United States Letters Patent No. 2,110,700, granted March 8, 1938 upon application of Frank R. Elder, and which is assigned to the assignee of this application.

The operation of the excitation circuits 13—16 will now be considered. Considering excitation circuit 13 in particular, capacitance 38 is charged from winding 17 through unidirectional conducting device 21 and is discharged through the circuit including resistance 27, inductance 28, control member 12 of electric valve means 8 and electric discharge device 23 at a predetermined time during the cycle of voltage of circuit 2 determined by the phase shifter 37. The magnitude of the current transmitted to the control member and its duration is determined by the constants of the excitation circuit 13. A more detailed description of the operation of the excitation circuits 13—16 may be obtained by reference to the above-mentioned patent.

The manner in which the electric valve means 8 and 9 operate during each cycle of voltage of the supply circuit 2 may be more fully appreciated by referring to the operating characteristics shown in Fig. 2. Curve A represents the voltage of circuit 2. When only excitation circuits 13 and 14 are employed the electric valve means 8 and 9 will conduct high frequency current during the intervals a—b and c—d. When all the excitation circuits, that is excitation circuits 13—16, are employed, the electric valve means 8 and 9 conduct high frequency current and hence effect energization of the load circuit 1 during the intervals a—b, c—d, e—f, and g—h.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an alternating current supply circuit, a load circuit, an oscillatory circuit energized from said supply circuit and including an inductive reactance, a capacitive reactance and a pair of reversely connected electric valve means for setting said oscillatory circuit into oscillation and for effecting energization of said load circuit from said oscillatory circuit, said electric valve means comprising a control means for controlling the conductivity thereof, and excitation means for said control means for rendering said pair of electric valve means simultaneously conductive for a predetermined portion of each cycle of voltage of said supply circuit.

2. In combination, an alternating current supply circuit, a load circuit, an oscillatory circuit energized from said supply circuit and including a pair of reversely connected electric valve means connected to energize said load circuit from said oscillatory circuit, said electric valve means each comprising a control means, and excitation means for transmitting to said control means electrical impulses to maintain said pair of electric valve means simultaneously conductive for a predetermined portion of each cycle of voltage of said supply circuit and for effecting energization of said load circuit.

3. In combination, an alternating current supply circuit, a load circuit, an oscillatory circuit energized from said supply circuit and including a pair of reversely connected electric valve means of the type employing an ionizable medium and each comprising an immersion ignitor control member, and excitation means for supplying to the control members impulses of current to maintain said electric valve means simultaneously conductive for a predetermined portion of each cycle of voltage of said supply circuit and for effecting energization of said load circuit from said oscillatory circuit for an interval of time.

4. In combination, an alternating current supply circuit, a load circuit, an oscillatory circuit energized from said supply circuit and including a pair of reversely connected electric valve means connected to energize said load circuit from said oscillatory circuit, each of said electric valve means comprising control means for controlling the conductivity thereof, excitation means for energizing said control means to render said electric valve means simultaneously conductive for a predetermined portion of each cycle of voltage of said supply circuit, and means for adjusting the time at which the period of conduction occurs during each cycle of voltage.

5. In combination, an alternating current supply circuit, a load circuit, an oscillatory circuit energized from said supply circuit and including a pair of reversely connected electric valve means for setting said oscillatory circuit into oscillation and for effecting energization of said load circuit, said electric valve means being of the type employing an ionizable medium and comprising an immersion ignitor control member, a pair of excitation circuits for transmitting impulses of current to the control members to render said electric valve means simultaneously conductive during a predetermined interval of time of each cycle of the voltage of said supply circuit, and phase-shifting means for adjusting the time of occurrence of said intervals of conduction during the voltage cycle of said supply circuit.

6. In combination, an alternating current supply circuit, a load circuit, an oscillatory circuit energized from said supply circuit and including a pair of reversely connected electric valve means connected to energize said load circuit from said oscillatory circuit and for effecting energization of said load circuit from said oscillatory circuit, said electric valve means being of the type employing an ionizable medium and comprising a control means, a pair of excitation circuits for transmitting electrical impulses to said control means to render said electric valve means simultaneously conductive during each positive half cycle of voltage of said supply circuit, and a second pair of excitation circuits for supplying electrical impulses to said control means to render said electric valve means simultaneously conductive during each negative half cycle of voltage of said supply circuit.

7. In combination, an alternating current supply circuit, a load circuit, an oscillatory circuit energized from said supply circuit and comprising a capacitance, an inductance and a pair of reversely connected electric valve means comprising a symmetrical discharge path for said capacitance through said inductance, said electric valve means each comprising control means, and an excitation means for rendering said electric valve means simultaneously conductive during a predetermined portion of each cycle of voltage of said supply circuit for effecting energization of said load circuit for a predetermined interval of time.

8. In combination, an alternating current supply circuit, a load circuit, a transformer connected to said load circuit, a capacitance connected to be charged from said supply circuit, said capacitance and the inductance of said transformer constituting an oscillatory circuit, a pair of reversely connected electric valve means connected in circuit with said capacitance and said transformer, said electric valve means comprising control means for controlling the conductivity thereof, and excitation means for rendering said pair of electric valve means simultaneously conductive to effect energization of said load circuit.

ORRIN W. LIVINGSTON.